(12) United States Patent
Takatsuka et al.

(10) Patent No.: US 8,417,109 B2
(45) Date of Patent: Apr. 9, 2013

(54) PHOTOGRAPHING DEVICE AND PHOTOGRAPHING CONTROL METHOD

(75) Inventors: Susumu Takatsuka, Tokyo (JP);
Noribumi Shibayama, Tokyo (JP);
Hisatoshi Suto, Tokyo (JP)

(73) Assignee: Sony Mobile Communications Inc., Tokyo (JP)

( * ) Notice: Subject to any disclaimer, the term of this patent is extended or adjusted under 35 U.S.C. 154(b) by 110 days.

(21) Appl. No.: 12/828,336

(22) Filed: Jul. 1, 2010

(65) Prior Publication Data
US 2011/0008036 A1    Jan. 13, 2011

(30) Foreign Application Priority Data
Jul. 8, 2009   (JP) ............................... P2009-161757

(51) Int. Cl.
*G03B 17/00* (2006.01)
*G03B 17/18* (2006.01)

(52) U.S. Cl. ...................................... 396/263; 396/286

(58) Field of Classification Search .......... 396/263–265, 396/286, 287, 291, 292; 348/222.1
See application file for complete search history.

(56) References Cited

U.S. PATENT DOCUMENTS

| 5,345,313 | A | 9/1994 | Blank | |
|---|---|---|---|---|
| 7,855,737 | B2 * | 12/2010 | Petrescu et al. | 348/239 |
| 2004/0239799 | A1 * | 12/2004 | Suzuki et al. | 348/370 |
| 2009/0066803 | A1 * | 3/2009 | Miyata | 348/222.1 |
| 2009/0079844 | A1 * | 3/2009 | Suzuki | 348/222.1 |
| 2010/0141781 | A1 * | 6/2010 | Lu | 348/222.1 |

FOREIGN PATENT DOCUMENTS

| EP | 1 431 804 | 6/2004 |
|---|---|---|
| JP | 2002 40550 | 2/2002 |
| WO | WO 2005 052685 | 6/2005 |

* cited by examiner

*Primary Examiner* — W. B. Perkey
*Assistant Examiner* — Minh Phan
(74) *Attorney, Agent, or Firm* — Frommer Lawrence & Haug LLP; William S. Frommer

(57) ABSTRACT

A photographing device, which includes a photographing section; a display section that displays a photography image taken by the photographing section; a person indicator setting section that sets a person indicator prepared beforehand on the display screen; an operation section that operates a target position and/or a target size of the person indicator; a person detection section that detects a position and/or a size of a person in the photography image; a comparison section that compares the detected position and/or size of the person in the photography image with the target position and/or size; a guiding instruction section that generates an instruction for the person to be photographed to guide toward a direction coinciding with the compared result; and a control section that controls the photographing section such that, when a predetermined condition is satisfied after the compared result falls within a predetermined allowable error, a shutter is activated.

15 Claims, 13 Drawing Sheets

FIG. 6A1
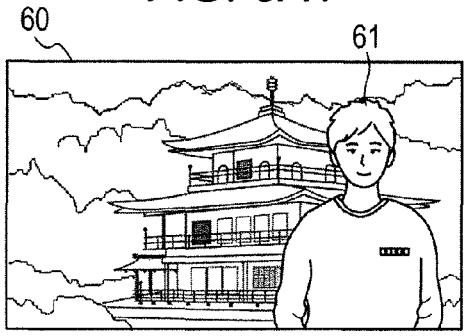
FIG. 6A2
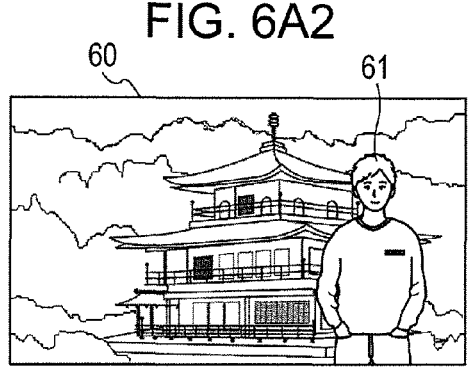
FIG. 6B1
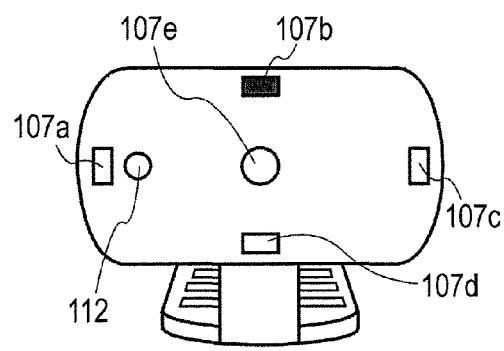
FIG. 6B2
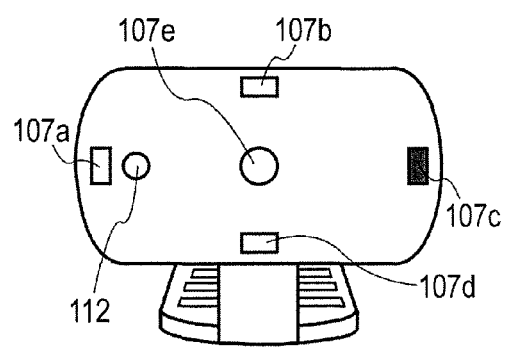
FIG. 6A3
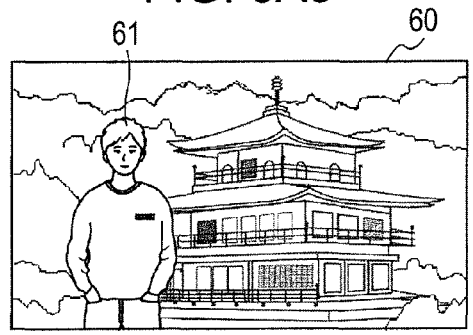
FIG. 6B3
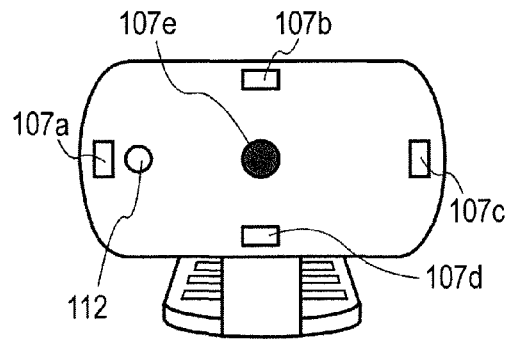

FIG. 7A1
FIG. 7A2
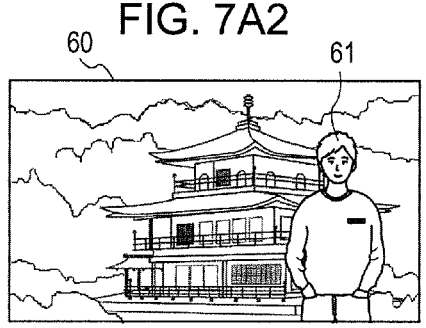
FIG. 7B1
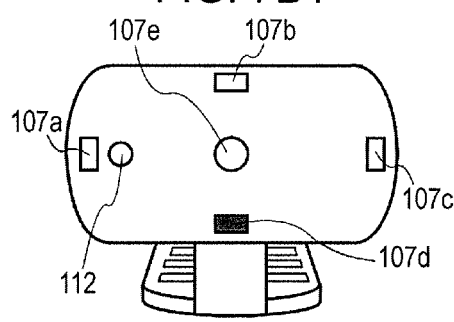
FIG. 7B2
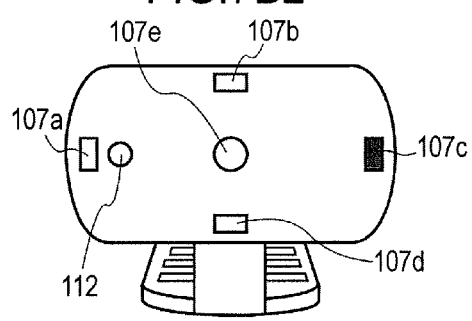
FIG. 7A3
FIG. 7A4
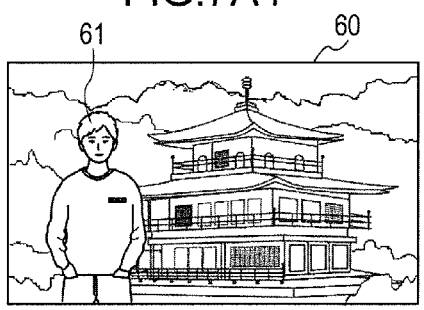
FIG. 7B3
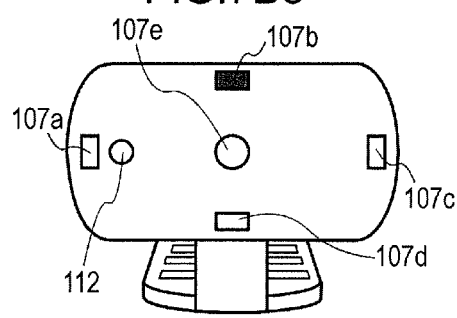
FIG. 7B4
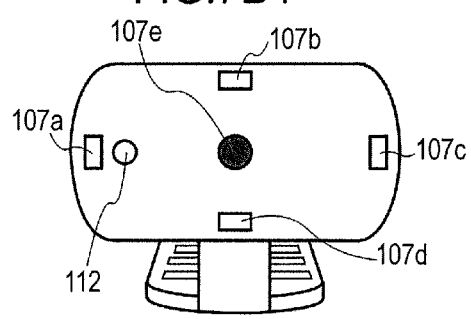

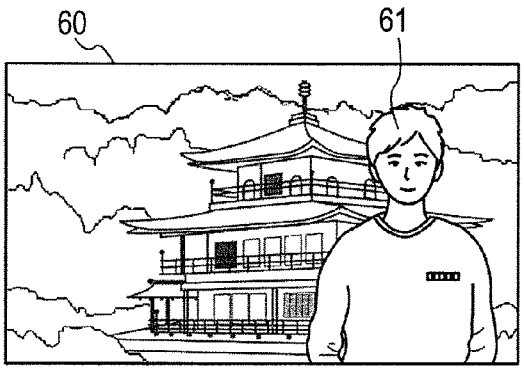
FIG. 10A1
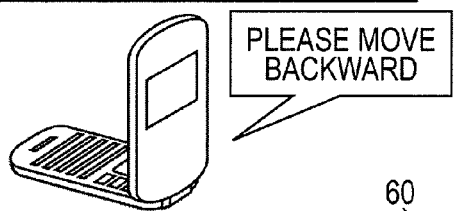
FIG. 10B1
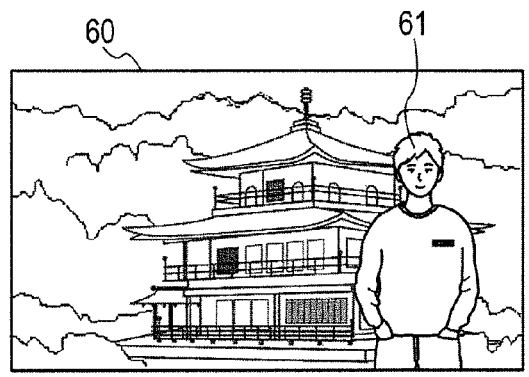
FIG. 10A2
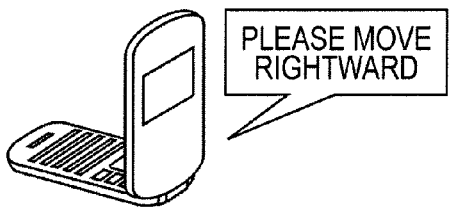
FIG. 10B2
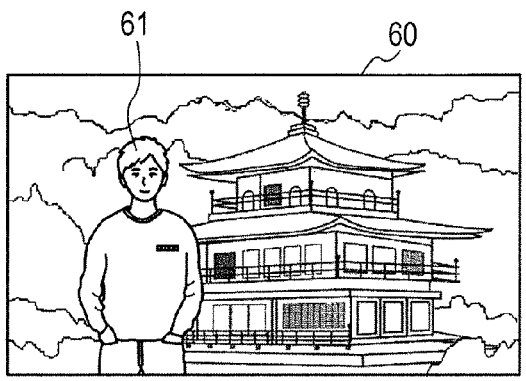
FIG. 10A3
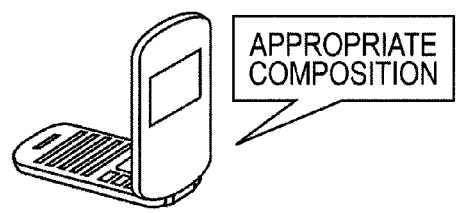
FIG. 10B3

TO

PHOTOGRAPHING DEVICE AND PHOTOGRAPHING CONTROL METHOD

BACKGROUND OF THE INVENTION

1. Field of the Invention

The present invention relates to a photographing device, more particularly to a photographing control method in which a photographer takes a photograph of him/herself.

2. Description of the Related Art

For an automatic photograph-taking device in which a person takes a self-photograph such as an identification photograph, there has been proposed a technique that recognizes a situation of the person to be photographed, and provides audio instructions regarding changing posture for the person to be photographed according to the recognized situation (see Japanese Unexamined Patent Application Publication No. 2002-40550).

Additionally, there has been used a technique of detecting a face area or a smiling face of a person existing in an image obtained through photographing.

SUMMARY OF THE INVENTION

At the time of photographing a person with a building, landscape or other subjects as a background, if a photographer exists in addition to the person to be photographed, the photographer can provide instructions for the person to be photographed prior to photographing by using the viewfinder of a camera or monitor screen, so that a position of the person can be adjusted with respect to the background.

However, when a photographer takes a self-photograph by using a self-timer and the like, it is only after the photograph-taking is completed that the photographer knows whether or not his/her position is preferable in the captured image with respect to the background.

Therefore, the photographer repeats photographing until the positional relationship between the background and the person to be photographed is fixed, or reluctantly accepts the result. This is the current situation.

Japanese Unexamined Patent Application Publication No. 2002-40550 describes a technique of taking a photograph in a limited space such as a space within an automatic photo booth. With this technique, it is difficult to actually place a position of a person to be photographed in a desired position with respect to a background of a building or landscape.

It is desirable to, at the time of self-photographing with a building or scene as a background, place a position of a person to be photographed in a desired position with respect to the background.

According to an embodiment of the present invention, there is provided a photographing device, which includes a photographing section, a display section that displays a photography image taken by the photographing section on a display screen, person indicator setting means for setting a person indicator prepared in advance on the display screen, an operation section that operates a target position and/or a target size of the person indicator, person detection means for detecting a position and/or a size of a person in the photography image, comparison means for comparing the detected position and/or the detected size of the person in the photography image with the target position and/or the target size, guiding instruction means for generating an instruction for the person to be photographed to guide toward a direction coinciding with a comparison result by the comparison means, and control means for controlling the photographing section such that, at a time when a predetermined condition is satisfied after the comparison result by the comparison means falls within a predetermined allowable error, a shutter is activated.

The guiding instruction means is, for example, light-guided instruction means that implements light-indication of a forward, backward, right or left direction to which the person to be photographed is to be moved. The light-guiding instruction means may include a plurality of light-emitting elements, or a sub-display section having a display screen.

The guiding instruction means may be audio guiding means that implements audio indication of a forward, backward, right or left direction to which the person to be photographed is to be moved.

The person detection means detects a position and/or a size of a particular portion of a person, for example, a face of the person.

The control means, preferably, sets an allowable error in a vertical direction larger than that in a horizontal direction, at the time of determining whether the detected position of the person is matched with the target position. This increases the allowance for error that is difficult to adjust regarding inclination of the photographing device in the vertical direction, height of the position where the photographing device is set, height of the person to be photographed, and the like. As a result, a case where the predetermined condition is not satisfied for indefinitely long periods of time because of the error in the vertical direction can be avoided.

The time when the predetermined condition is satisfied indicates, for example, that a predetermined time period elapses from a time when the comparison result by the comparison means falls within the predetermined allowable error, or that a smile of the person to be photographed is detected by the person detection means after the comparison result by the comparison means falls within the predetermined allowable error.

The photographing device may further include means for, when the comparison result by the comparison means falls within the predetermined allowable error, notifying to that effect by light or audio.

The photographing device may include detection means for detecting a vertical direction, and in this case, the person indicator setting means sets the person indicator on the basis of the detected vertical direction.

When a plurality of persons to be photographed exist, the comparison means compares a position and/or a size of a person to be photographed who is identified in accordance with a predetermined rule with the target position and/or the target size.

According to an embodiment of the present invention, there is provided a photographing control method, which includes the steps of displaying a photography image of a background on a display screen in accordance with user's operation to a photographing section, setting a person indicator prepared in advance on the display screen in accordance with user's operation while overlaying the person indicator on the background, detecting a position and/or a size of a person to be photographed in the photography image of the background, comparing the position and/or the size of the person detected in the photography image with the target position and/or the target size, generating an instruction for the person to be photographed to guide toward a direction coinciding with the comparison result, and controlling the photographing section such that, at a time when a predetermined condition is satisfied after the comparison result falls within a predetermined allowable error, a shutter is activated.

According to embodiments of the present invention, by checking and setting in advance a positional relationship between a background and a person to be photographed using a person indicator, it becomes possible to guide and instruct the person to be photographed so as to make his/her standing position consistent with the position set in advance. As a result, a desired position of the person to be photographed with respect to the background can be relatively easily determined at a time of self-photographing with a building or scene as the background.

BRIEF DESCRIPTION OF THE DRAWINGS

FIGS. 6A1-6A3 and 6B1-6B3 illustrate a specific example of the guiding instruction using the LEDs shown in FIG. 5;

FIGS. 7A1-7A4 and 7B1-7B4 illustrate another specific example of the guiding instruction using the LEDs shown in FIG. 5;

FIGS. 10A1-10A3 and 10B1-10B3 illustrate another example of the guiding instruction according to the embodiment of the present invention;

DESCRIPTION OF THE PREFERRED EMBODIMENTS

Hereinbelow, a preferred embodiment according to the present invention will be specifically described with reference to drawings.

Figure 1:
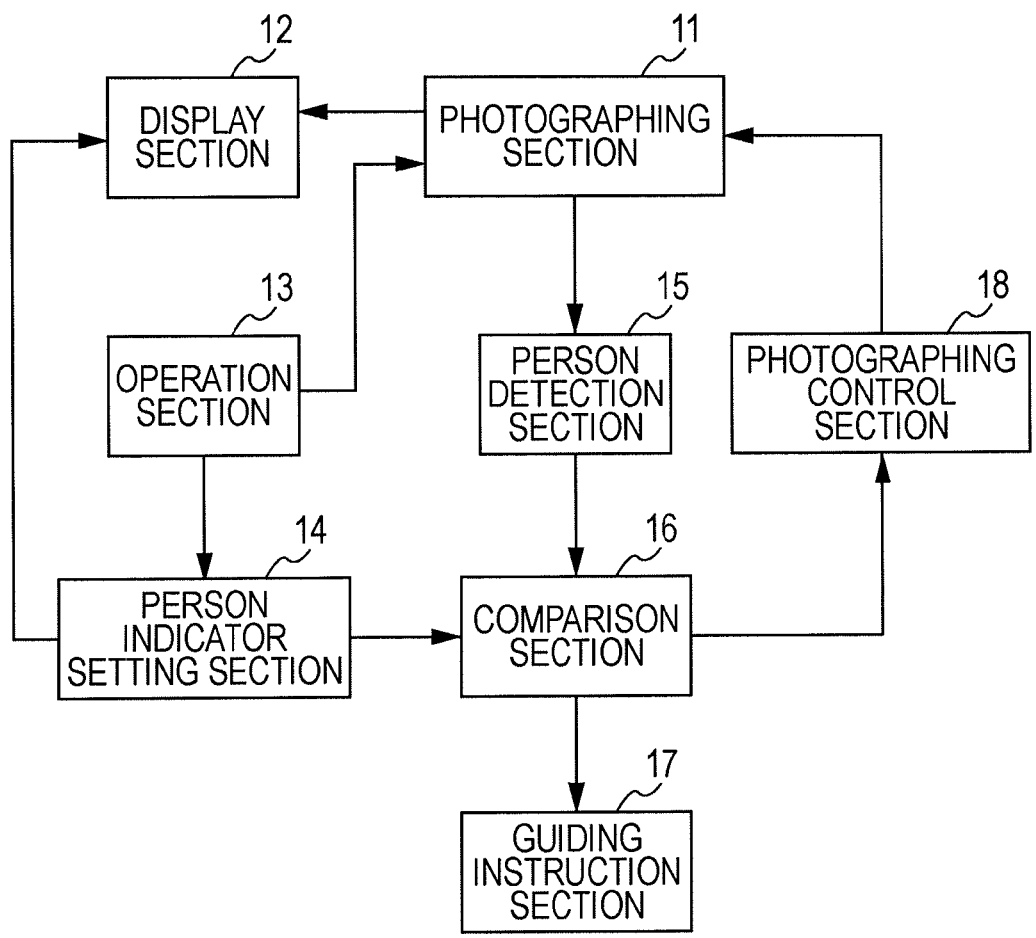
FIG. 1 is a block diagram showing main configuration elements of a photographing device according to an embodiment of the present invention.

First, FIG. 1 is a block diagram showing main configuration elements of a photographing device according to this embodiment of the present invention.

A photographing section 11 serves as an existing photographing section such as a digital camera that acquires image data of a subject, and has a lens, image pickup elements such as CMOS sensor or CCD sensor, and the like.

A display section 12 has a display panel such as an LCD and an organic EL constituting a display screen, and serves as a display that displays user interface information, a photography image of the photographing section 11, and the like.

An operation section 13 serves as an operation section that allows a user to operate the photographing section 11, a person indicator setting section 14, and the like, and has various operation keys, dials, touch sensors, etc.

The person indicator setting section 14 serves as a setting section that presets preferable arrangement (composition) of a person (user) relative to the background to be photographed. With this person indicator setting section 14, as described below, it becomes possible to, with the photographing section 11 being the so-called camera-through state, set a previously prepared person indicator at a desired position and in a desired size relative to the background image on the display screen of the display section 12. In this camera-through state, photographing is continually implemented at certain intervals, and images of a subject are sequentially displayed on the display screen on a real-time basis. The person indicator is an object used as a substitute for the user, and a human-shaped image is employed in this embodiment. The person indicator is not limited to this, and any display indicator may be employed, provided that the targeted position and targeted size of the person are recognizable. For example, the display indicator may be a simple figure such as quadrangle or oval imitating a human face. Alternatively, by cutting out the person indicator portion from the photography image of the user in advance, the cut-out person indicator portion may be employed as this display indicator.

A person detection section 15 serves as a detection section that detects a position and size of a person to be photographed (person image), who appears in the photography image after a user completes a setting of the person indicator setting section 14 and moves to a position before the photographing section 11 and in front of the background to be photographed within the field of view of a camera. Herein, the position and size of the person are detected by detecting a face of the person, more specifically, by detecting the position and size of person's face.

A comparison section 16 compares the detected position and size of the person by the person detection section 15 with a target position and/or a target size set by the person indicator setting section 14.

A guiding instruction section 17 serves as an instruction section that generates a guiding instruction to guide the person to be photographed (user) toward a direction coinciding with the comparison result by the comparison section 16. As described later, this guiding instruction or result may be notified by using audio or light.

A photographing control section 18 serves as a controller that controls so as to activate a shutter of the photographing section 11 after the comparison result by comparison section 16 falls within a predetermined allowable error and a predetermined condition is satisfied. The predetermined condition will be described later.

Hereinbelow, a camera-equipped mobile terminal will be described as one example of the photographing device according to this embodiment of the present invention. However, the photographing device is not limited to such mobile terminal, and may be a digital camera for example.

Figure 2:
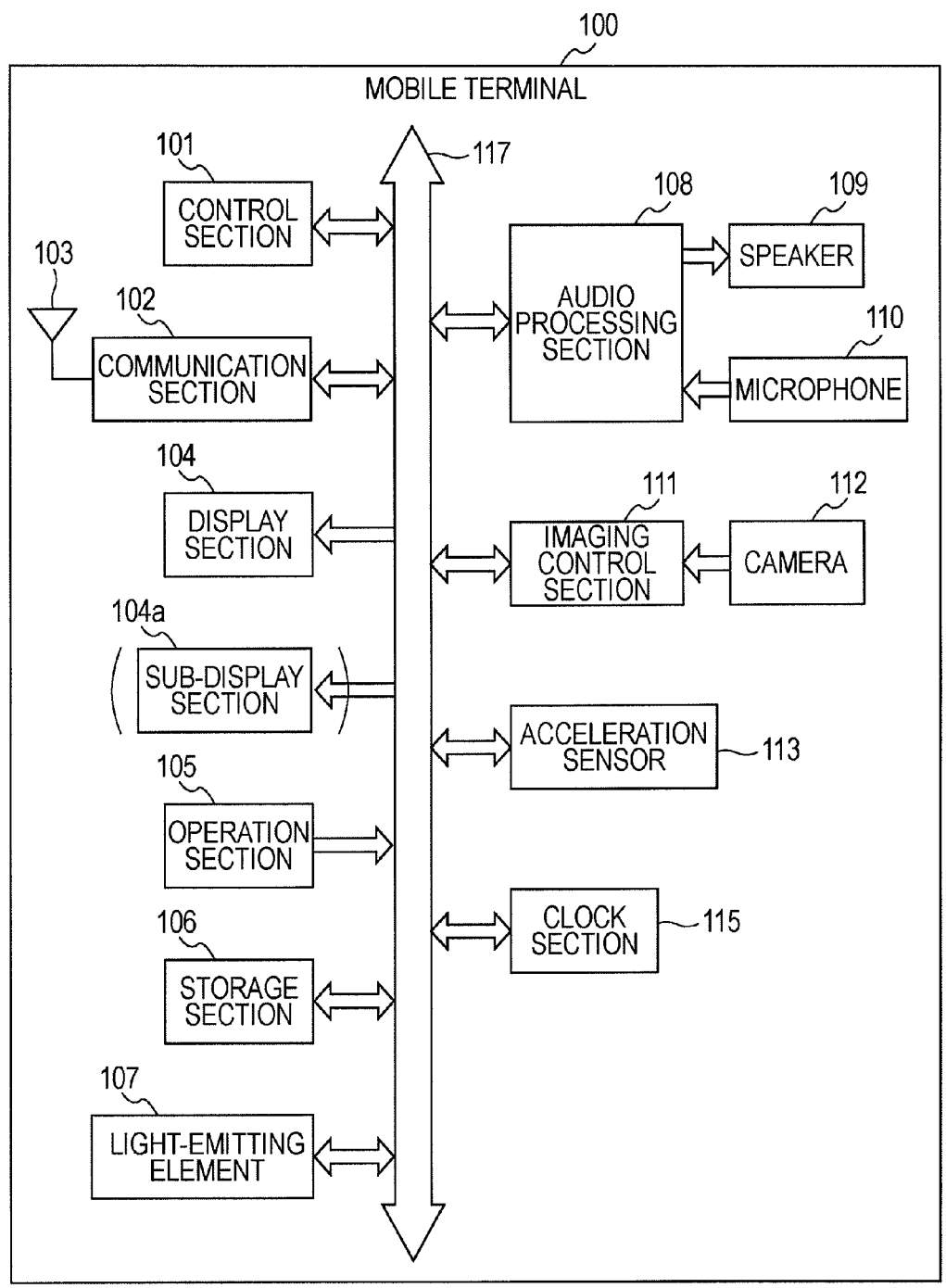
FIG. 2 illustrates the hardware configuration of a mobile phone terminal according to the embodiment of the present invention.

FIG. 2 illustrates the hardware configuration of a mobile phone terminal as a typical mobile terminal.

This mobile terminal 100 has a control section 101, a communication section 102, an antenna 103, a display section 104, a sub-display section 104a, an operation section 105, a storage section 106, a light-emitting element 107, an audio processing section 108, an imaging control section 111, an acceleration sensor 113, and a clock section 115, which are connected with each other through a bus 117. To the audio processing section 108, a speaker 109 and a microphone 110 are connected. To the imaging control section 111, a camera 112 (photographing section) is connected.

The control section 101 has a CPU, controls each section in the mobile terminal 100, and implements necessary data processing. In this embodiment, this control section 101 constitutes the person indicator setting section 14, the person detection section 15, the comparison section 16, the guiding instruction section 17, the photographing control section 18, and the like, as shown in FIG. 1.

The communication section 102 implements a wireless communication with base stations through the antenna 103. This function is not indispensable in this embodiment.

The display section 104 corresponds to the display section 12 shown in FIG. 1, includes a display device such as an LCD and organic EL, and displays information on a display screen thereof.

The sub-display section 104a is not an indispensable configuration element. The sub-display section 104a, together with the control section 101, constitutes the guiding instruction section 17, according to the embodiment described later, and, particularly constitutes a light-guiding instruction section that provides light-indication of a forward, backward, right or left direction to which the person to be photographed has to move.

The operation section 105 corresponds to the operation section 13 shown in FIG. 1, has ten-key or various control keys, and receives instruction or data input from the user.

The storage section 106 has a memory such as a ROM, RAM and flash memory, and stores an OS, computer programs such as various application programs, and various data. The various data include the person indicator (or photography image of the user) according to this embodiment.

The light-emitting element 107 includes plural light-emitting elements such as an LED. In this embodiment, the light-emitting element 107, together with the control section 101, constitutes the guiding instruction section 17, and, particularly constitutes the light-guiding instruction section that provides light-indication of a forward, backward, right or left direction to which the person to be photographed has to move.

The audio processing section 108 is connected to the speaker 109 that outputs received sounds during telephone communication, warning sounds, music data sounds, audio instructions according to this embodiment and the like, and the microphone 110 that picks up sounds such as the transmitting sound during telephone communication, and implements predetermined audio processing including coding and decoding of audio signals. The audio processing section 108 and speaker 109, together with the control section 101, constitute the guiding instruction section 17 shown in FIG. 1, and, particularly constitutes an audio guiding section that provides audio-indication of a forward, backward, right or left direction to which the person to be photographed has to move.

The acceleration sensor 113 serves as a detection section that detects, for example, acceleration in three axes directions perpendicular to each other. Since only the gravitational acceleration works at the time when the terminal is standing still, the acceleration sensor 113 functions as the "section that detects a vertical direction" in this embodiment. However, the "section that detects the vertical direction" is not limited to the acceleration sensor.

The clock section 115 includes a real time clock (RTC) and provides a clock function that generates year-month-day information and time information, and a timer function that sets a timer setting.

Hereinbelow, operation of this embodiment having the configuration as described above will be explained.

Figure 3:
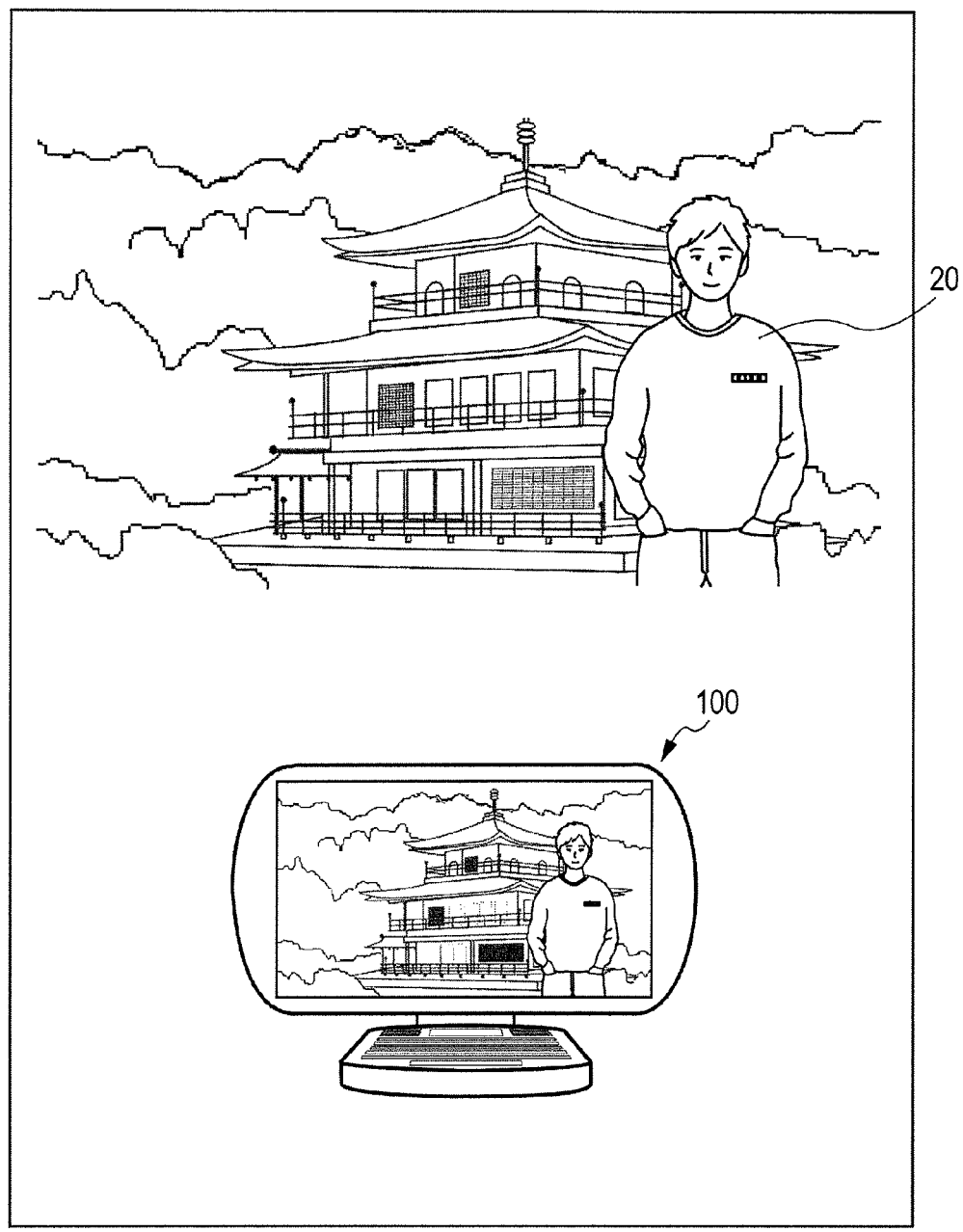
FIG. 3 illustrates a specific situation of taking a photograph using a camera according to the embodiment of the present invention.

FIG. 3 illustrates a specific situation of taking a photograph using a camera according to this embodiment.

A user 20 of the mobile terminal 100 takes a photograph (self-photographing) using a timer and the like with a subject such as a building or scene as a background. In this example, it is assumed that the user mounts the mobile terminal at an appropriate position, activates a photographing using the timer and the like with a temple being contained in camera's view, and moves the user to the inside of the camera's view to take a self-photograph with the temple being the background thereof. However, it is difficult to accurately determine which position the user has to stand in front of the camera to obtain a desirable photographing-result in terms of the relationship between the background of the temple and the user.

Figure 4A:
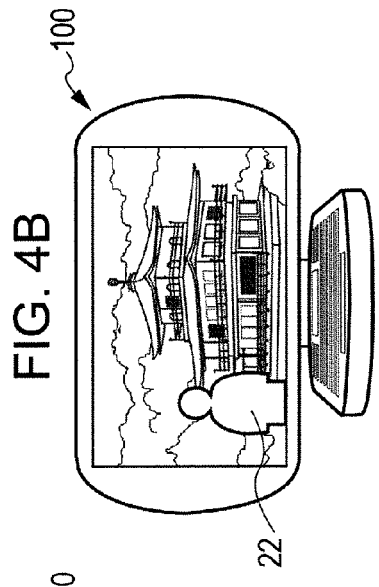
FIGS. 4A-4D illustrate a person indicator according to the embodiment of the present invention.
Figure 4B:
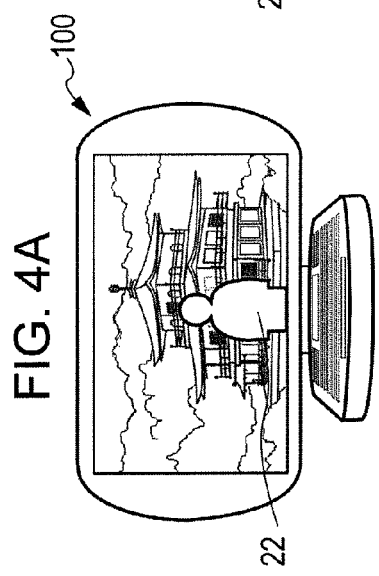
Figure 4C:
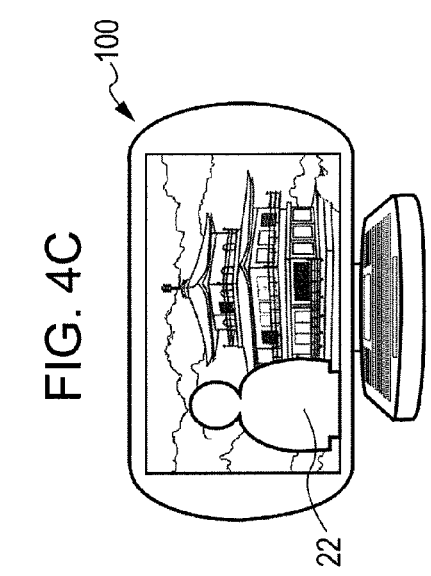

To deal with the situation above, as shown in FIGS. 4A-4D, prior to photographing, this embodiment sets, at a desired position and in a desired size, a person indicator 22 prepared in advance and serving as a substitute for the user in front of the background to be photographed. As the mobile terminal 100, this example employs a type of terminal in which an upper housing accommodating the display section and the photographing section in a back-to-back manner and a lower housing accommodating the operating section are coupled with a so-called two-axis hinge. However, the embodiment of the present invention is not limited to this type of terminal. With this type of mobile terminal, the acceleration sensor 113 is accommodated in the upper housing accommodating the photographing section. Therefore, even if the orientation of the upper housing is changed, the vertical direction can be determined in the resulting orientation, and hence, the person indicator 22 is displayed such that the head portion thereof is placed on the upper side along the vertical direction. Additionally, the upper, lower, right and left directions on the screen are determined on the basis of this vertical direction. However, the default position and the default size of the person indicator 22 may be set arbitrarily. For example, considering the operational convenience, as shown in FIG. 4A, the person indicator 22 may be displayed on a center of the display screen in a middle size among the allowable changeable sizes. To place the person indicator 22 at the side portion in the background, the person indicator 22 is moved parallel in the horizontal direction by operating the operation section, as shown in FIG. 4B. Additionally, if the change in size of the person indicator 22 is necessary, the size of the person indicator 22 is changed at this position by implementing another operation to the operation section, as shown in FIG. 4C.

Alternatively, as for the default position and size (collectively, referred to as arrangement), considering user's preferences, the result of the size and position in the previous time may be stored in a predetermined area in the storage section 106 in a non-volatility manner, and be used as a default setting in the next time.

Figure 4D:
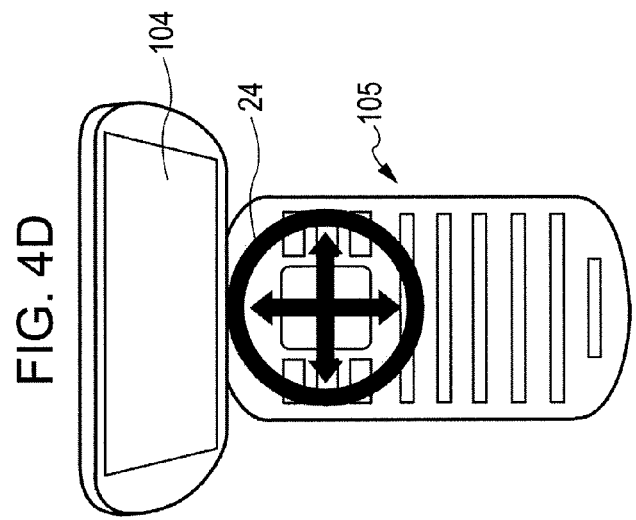

The operation of the position and the size of the person indicator 22 on the display screen is made through key operation of the operation section 105, and the like. The specific operation method for operating the position and size of the person indicator 22 is not limited, and any operation method may be used. A mark 24 in FIG. 4D shows the operation for movement using a so-called cross key, as one example. The position and size of the person indicator 22 set by the user are temporarily stored in a predetermined area in the storage section 106.

Then, the user moves to a position in front of the camera. When the user enters the inside of the camera's view, detection of a person image (especially face image) of a person to be photographed in the photography image is made, comparison of the position and size of the person with the set target position and target size is made, and a guiding instruction for guiding the user to be photographed toward a direction coinciding with the comparison result is generated.

Figure 5:
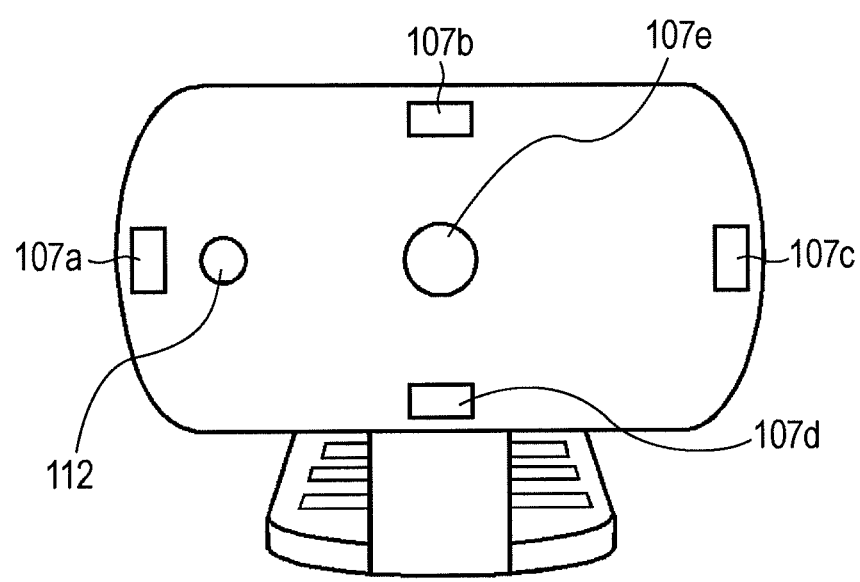
FIG. 5 illustrates LEDs serving as one example of a light-guiding instruction section that provides a guiding instruction according to the embodiment of the present invention.

FIG. 5 shows LEDs 107a-107e serving as the light-emitting element 107, which is one example of the light-guiding instruction section that provides the guiding instruction according to this embodiment. In this example, the LEDs 107a-107d are four light-emitting elements for the guiding instruction of the movement direction for user to be photographed, each arranged in four edge portions on a surface (rear surface relative to the display section 104) where (a lens portion of) the camera 112 in the upper housing is disposed. Additionally, the LED 107e disposed at the center portion of the LEDs 107a-107d is a light-emitting element for, when the person indicator coincides with the comparison result in terms of the position and size of the user, notifying the user to that effect. Light-emitting color or light-emitting mode between the LEDs 107a-107d and the LED 107e may be different. For example, the light-emitting color of the LED 107a-107d may be red, and the LED 107e may be colored in green, and the like. Additionally, the light-emitting mode may include lighting and blinking. The light intensity or blinking cycle may be changed. For example, change in the light intensity or blinking cycle of the LEDs 107a-107d may be utilized not only for indicating the movement direction, but also for indicating rough distances to be moved. That is, it may be indicated that, as the light intensity increases or the blinking cycle becomes shorter, the distance to be moved increases.

Additionally, the blinking of the LED 107e may be used, for example, for notifying the user of the countdown status in synchronization with timer counts in unit of time (for example, second) as described later.

FIGS. 6A1-6A3 and 6B1-6B3 show a specific example of a guiding instruction using the LEDs shown in FIG. 5. FIGS. 6A1-6A3 show photography images 60 under the camera-through state. FIGS. 6B1-6B3 show statuses of LEDs 107a-107e of the mobile terminal 100, each of which corresponds to FIGS. 6A1-6A3. FIGS. 6B1-6B3 show appearances of the mobile terminal as viewed from the user (person) positioned in the background in the photography image 60. It is assumed that the person indicator 22 is set to be disposed in the position shown in FIG. 4C.

In FIG. 6A1, the size of a user image 61 in the photography image 60 is larger than the set size of the person indicator. Then, as shown in FIG. 6B1, the mobile terminal emits (lighting or blinking) the LED 107b on the upper side thereof. This instructs the user to move user's current position away from the camera (move backward). As the user moves away from the camera, the size of the person image in the photography image 60 becomes smaller, and then, the LED 107b stops emitting when the size of the user image 61 agrees with the size of the person indicator within the allowable error in the condition of FIG. 6A2. In this state, however, the position of the user image 61 still deviates from the set position of the person indicator in the horizontal direction. Then, the terminal emits the LED 107c as shown in FIG. 6B2. In this case, since the LED on the right side as viewed from the user who faces the terminal is emitting, the user is instructed to move toward user's right hand side. The LED 107c stops emitting when, as the user moves toward the user's right hand side, the position of the user image 61 agrees with the set position of the person indicator within the allowable error, as shown in FIG. 6A3. If the position and size of the user image 61 agree with those of the person indicator set beforehand within the allowable error, the center LED 107e emits (lighting or blinking) as shown in FIG. 6B3. As a result, the user knows that the position where the user stands agrees with the set position.

Note that, at the time of determining whether the detected position of the face matches the position of the person indicator, it may be difficult to match the positions in the vertical direction (upper limit direction of the screen) due to various factors such as inclination of the camera in the vertical direction (angle in the vertical surface of the optical axis of lens), height of the position where the camera is set, and height of the person to be photographed. To deal with this, it may be possible to set the allowable error of the position in the vertical direction larger than that in the horizontal direction. The "set the allowable error larger" includes a case where the position determination is not made, or a case where the determined result is ignored.

FIGS. 7A1-7A4 and 7B1-7B4 show another specific example of the guiding instruction using the LEDs shown in FIG. 5. FIGS. 7A1-7A4 show the photography images 60 under the camera-through state. FIGS. 7B1-7B4 show statuses of the LEDs 107a-107e of the mobile terminal 100, each of which corresponds to FIGS. 7A1-7A4. FIGS. 7B1-7B4 show appearances of the mobile terminal as viewed from the user (person) positioned in the background in the photography image 60. In this example, it is also assumed that the arrangement of the person indicator 22 is set to be disposed at a position as shown in FIG. 4C.

In FIG. 7A1, the size of the user image 61 in the photography image 60 is smaller than the set size of the person indicator. Then, as shown in FIG. 7B1, the mobile terminal emits (lighting or blinking) the LED 107d on the lower side thereof. This instructs the user to move user's current position closer toward the camera (move forward). As the user moves closer to the camera, the size of the person image in the photography image 60 becomes larger, and then, the LED 107d stops emitting when the size of the user image 61 agrees with the size of the person indicator within the allowable error in the condition of FIG. 7A2. In this state, however, the position of the user image 61 still deviates from the set position of the person indicator in the horizontal direction. Then, the terminal emits the LED 107c as shown in FIG. 7B2. In this case, since the LED on the right side as viewed from the user who faces the terminal is emitting, the user is instructed to move toward user's right hand side. The LED 107c stops emitting when, as the user moves toward the user's right hand side, the position of the user image 61 agrees with the set position of the person indicator within the allowable error, as shown in FIG. 7A3. In this case, however, it is assumed that the user moves forward while moving toward the user's right hand side, and the size of the user image 61 becomes larger than that of the person indicator. Then, as shown in FIG. 7B3, the LED 107b emits to instruct the user to move backward. As a result, if the position and size of the user image 61 agree with those of the person indicator set beforehand within the allowable error, the center LED 107e emits (lighting or blinking) as shown in FIG. 7B4. This enables the user to know that the position where the user stands agrees with the preferable standing position, which is set by using the person indicator.

There may be a case where, after the sizes are matched as described above, the position is corrected, and correction of the size is further necessary, accordingly. Or, there may exist a converse case. To correct the errors of the size and the position, it is not limited which instruction is firstly outputted. Additionally, it may be possible to output both the size instruction and the position instruction at the same time.

Figure 8A:
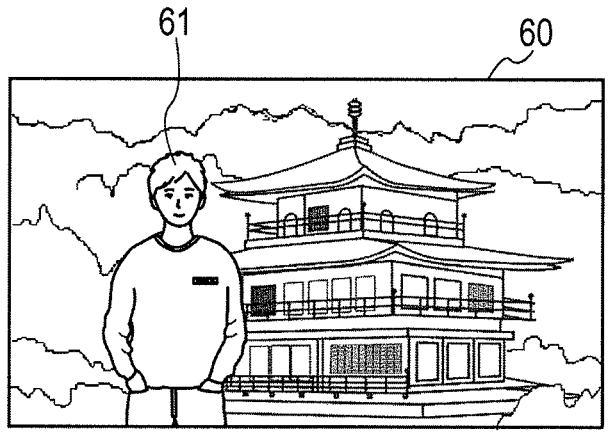
FIGS. 8A and 8B illustrate one example method of activating a shutter in the embodiment of the present invention.
Figure 8B:
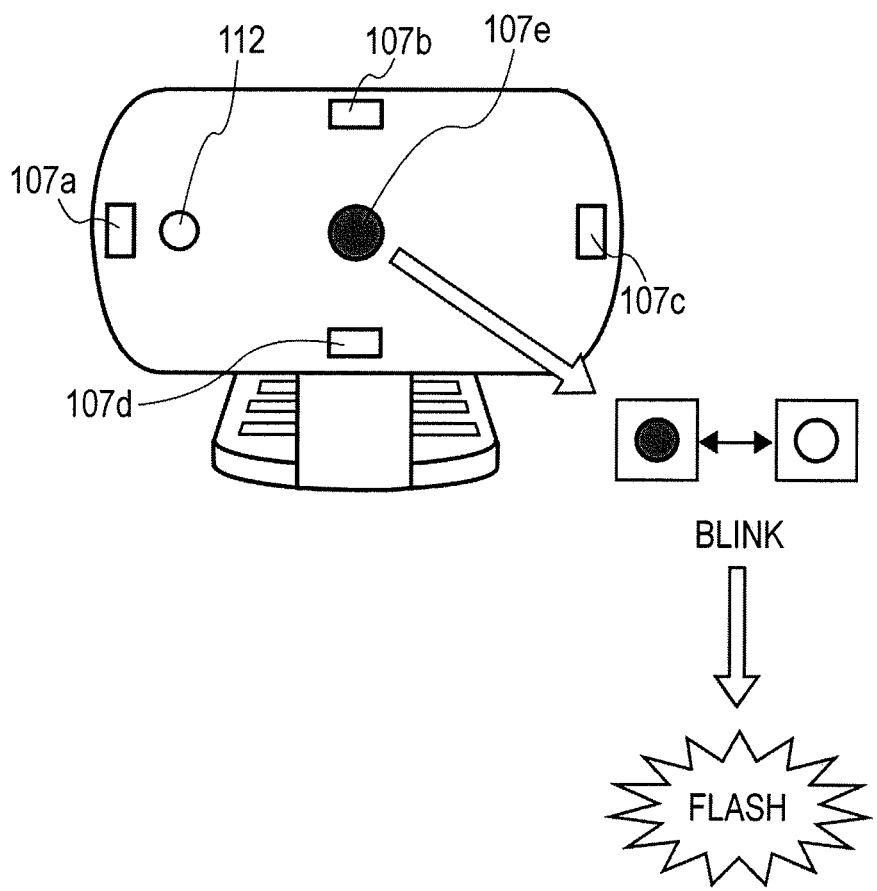

FIGS. 8A and 8B illustrate an example method of activating a shutter for actually taking the photograph after the user's standing position matches the desired standing position. In this example, the center LED 107e starts emitting (preferably blinking), and after a predetermined period of time has elapsed, the shutter is automatically activated. Although, in FIG. 8B, the state of the shutter being activated is shown as a flash emitting, it does not matter whether the flash emitting exists or not. Additionally, the "predetermined period of time" may be fixed value, or may be a value that the user can change and set.

Figure 9A:
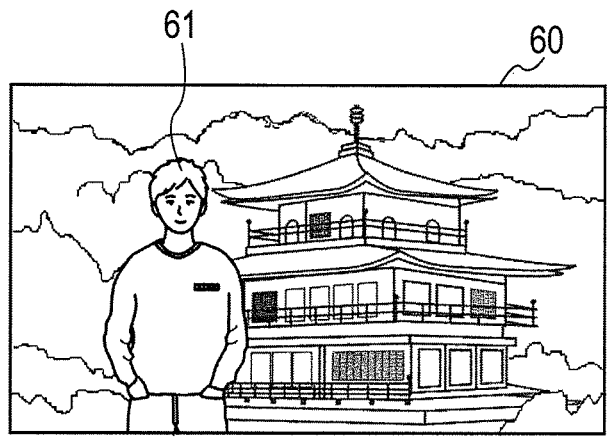
FIGS. 9A and 9B illustrate another example method of activating the shutter in the embodiment of the present invention.
Figure 9B:
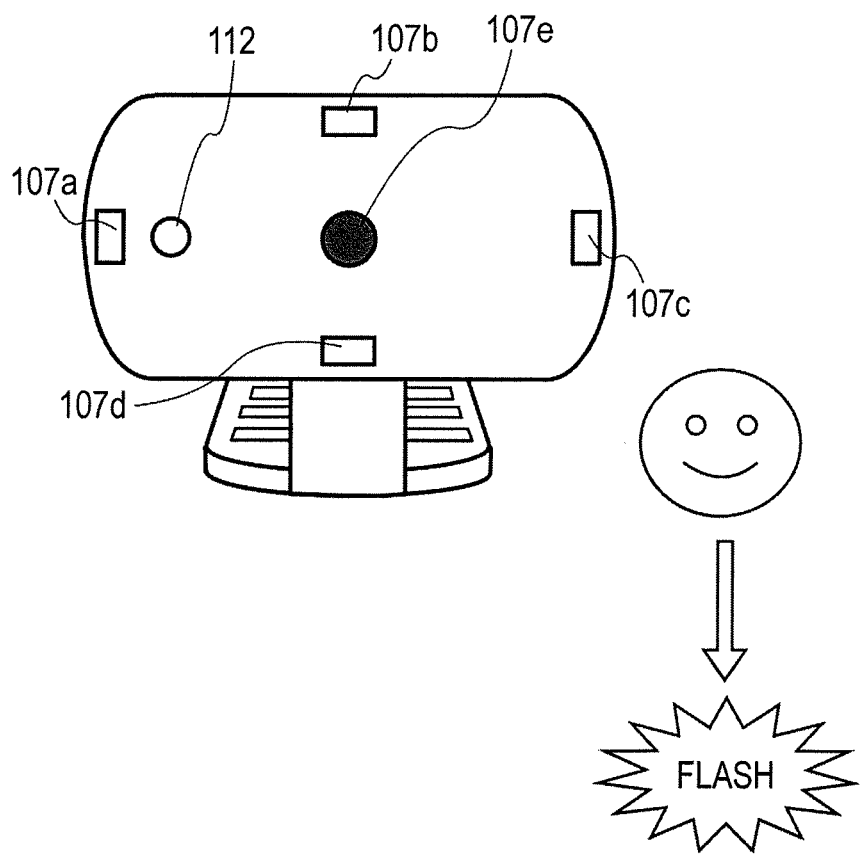

FIGS. 9A and 9B illustrate another example method of activating the shutter for actually taking the photograph after the user's standing position matches the desired standing position.

In this example, after the center LED 107e emits (lighting or blinking), the shutter is automatically activated upon detecting of user's smile. The user's smile may be determined on the basis of user's photography image. Activating the shutter triggered by the detection of the smile as described above is a general technique, and hence, detailed explanation thereof is omitted herein.

FIGS. 10A1-10A3 and 10B1-10B3 illustrate another example of the guiding instruction according to this embodiment. In this example, the guiding instruction is implemented by issuing audio messages prepared in advance from the mobile terminal. As for the audio messages, the relationship between FIGS. 10A1-10A3 and FIGS. 10B1-10B3 is the same as that between FIGS. 6A1-6A3 and FIGS. 6B1-6B3. The audio messages may include "please move backward" and "please move rightward", shown in FIGS. 10B1 and 10B2, "please move forward", and "please move leftward". When the position matches the desired position, in this example, the audio message "appropriate composition" is outputted. Note that, unlike the mode of the terminal as shown in FIGS. 6A1-6A3 and 6B1-6B3, etc., the LEDs 107a-107e are not necessary for the mode of the mobile terminal in FIGS. 10A1-10A3 and 10B1-10B3.

For the guiding instruction as shown in FIGS. 10A1-10A3 and 10B1-10B3, it may be possible to employ the configuration in which the shutter is automatically activated after a predetermined time period elapses from a time of issuing the message "appropriate composition". Alternatively, it may also be possible to employ a configuration in which the shutter is automatically activated by using the user's smile as the trigger after the message "appropriate composition" is issued.

FIGS. 11A-11F illustrate still another example of the guiding instruction according to this embodiment.

Figure 11D:
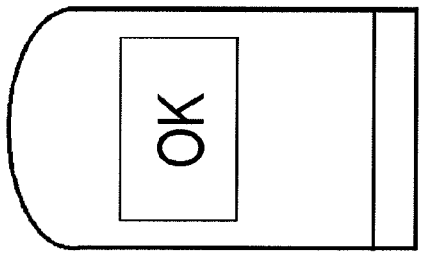
FIGS. 11A-11F illustrate still another example of the guiding instruction according to the embodiment of the present invention.
Figure 11C:
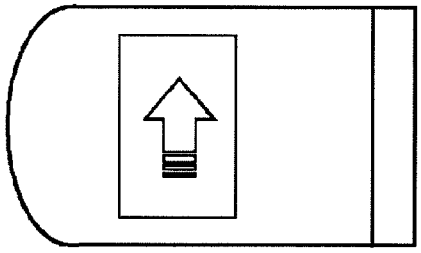
Figure 11B:
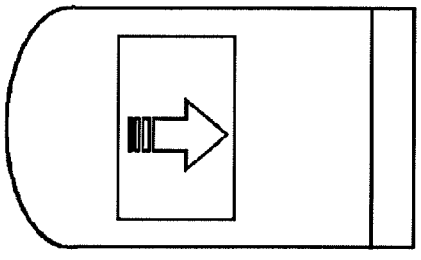
Figure 11F:
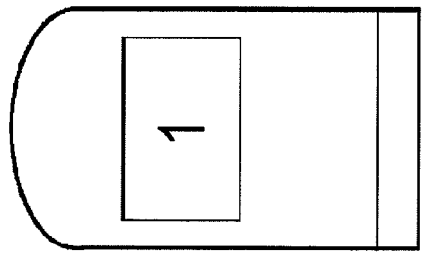
Figure 11E:
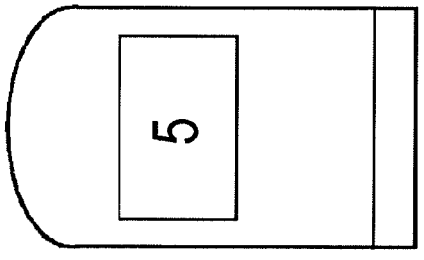
Figure 11A:
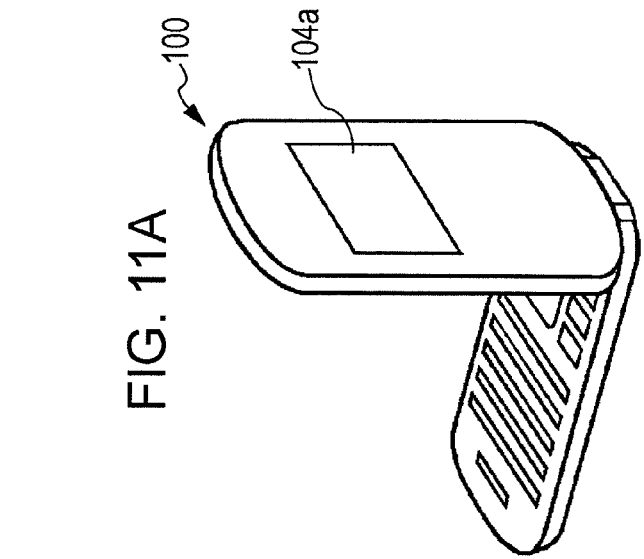

FIG. 11A shows an appearance of the mobile terminal 100. In this example, it is assumed that the sub-display section 104a is disposed on a surface of the housing of the mobile terminal 100 where the camera 112 is provided. In this example, as shown in FIGS. 11B and 11C, the movement direction for guiding the user is indicated by an arrow in a display screen of the sub-display section 104a. In lieu of the arrow or in addition to the arrow, a wording "forward", "backward", "rightward" or "leftward" may be displayed. Although the wording "OK" is displayed at the time when the position matches the desired standing position, the displaying is not limited to this.

Additionally, as shown in FIGS. 11E and 11F, it may be possible to display countdown numbers for indicating the elapsed time period from the time when the position matches the desired standing position. This countdown number enables the user to easily estimate a timing when the shutter is activated.

Figure 12:
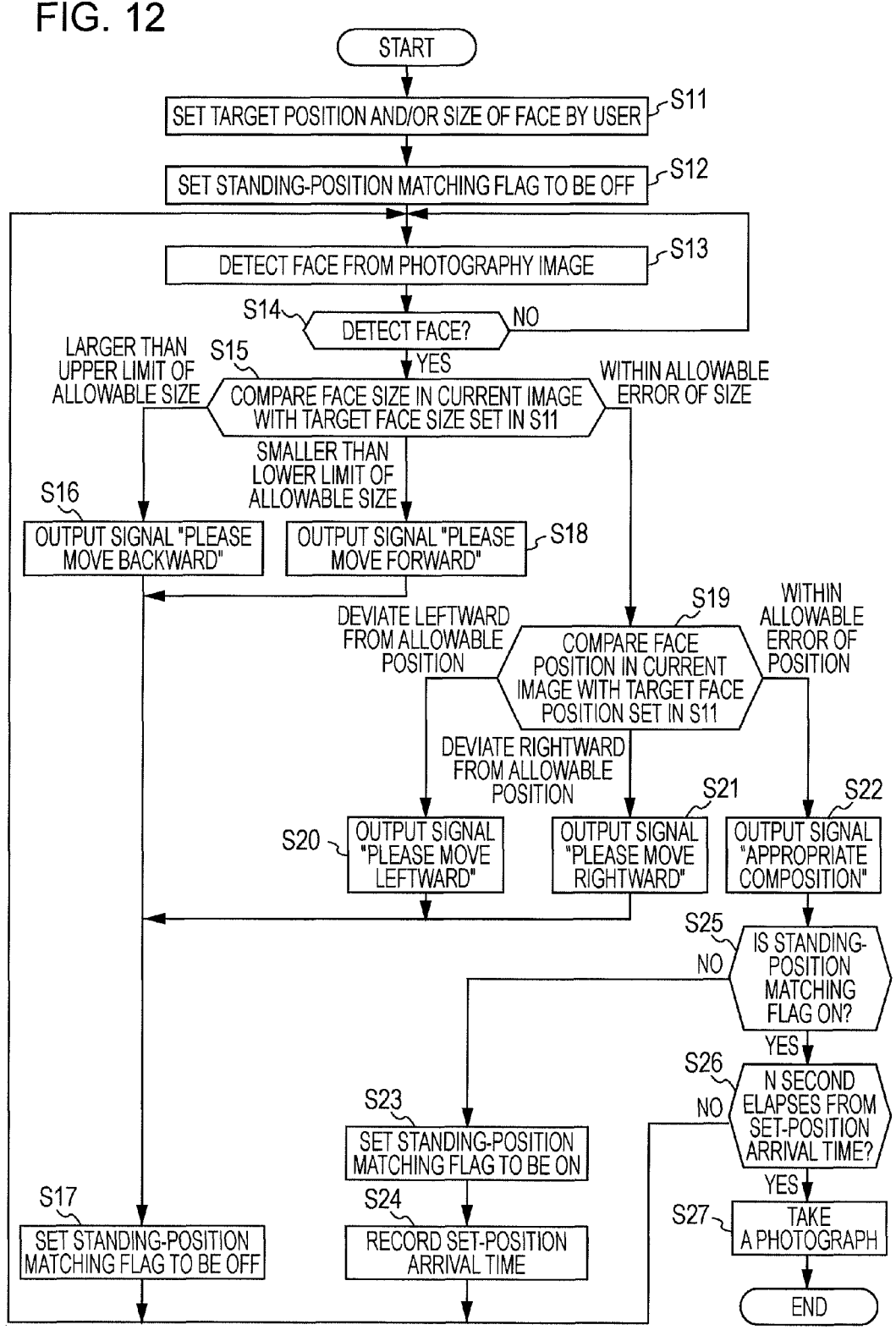
FIG. 12 is a flowchart showing a process procedure of a self-photographing using the mobile terminal according to the embodiment of the present invention.

FIG. 12 is a flowchart showing a process procedure of the self-photographing using the mobile terminal according to this embodiment. This process is realized by executing a program in the storage section 106 by the control section 101 in FIG. 2, and starts when the photographing mode for the self-photographing is activated in the mobile terminal.

First, the user mounts the mobile terminal on a stable base, etc. (on a tripod if possible) while the camera of the mobile terminal is facing the background to be photographed, and sets (the face of) the person to be photographed at the target position and in the target size by operating the person indicator on the display screen (S11). Then, a standing-position matching flag is set to be OFF (S12). The standing-position matching flag is a process parameter to indicate whether the position and size of the person to be photographed in the photography image match the target position and target size within the predetermined allowable error. The term OFF indicates a non-match, and the term ON indicates a match.

Next, the person image of the person to be photographed, especially person's face is detected from the camera-through photography image (S13). Upon detecting the face (S14), the process proceeds to step S15.

In step S15, the face size in the current image is compared with the target face size set in step S11. If the detected face size is larger than the upper limit of the allowable size, a signal "please move backward", namely, a signal instructing the person to be photographed to move backward is outputted (S16). If the detected face size is smaller than the lower limit of the allowable size, a signal "please move forward", namely, a signal instructing the person to be photographed to move forward is outputted (S18). These signals are converted into a predetermined guiding instruction using the light or audio as described above. If the standing-position matching flag is ON, the flag is set to be OFF (S17), and the process returns to step S13. If the standing-position matching flag is already OFF, the OFF state is maintained.

If the detected face size is smaller than the lower limit of the allowable size in step S15, the signal "please move forward" is outputted (S18), and the process proceeds to step S17 described above.

In step S15, if the detected face size falls within the allowable error, the face position in the current image is compared with the target face position set in step S11 (S19). If the detected face position is deviated leftward from the allowable position range, a signal "please move leftward", namely, a signal instructing the person to be photographed to move leftward is outputted (S20). If the detected face position is deviated rightward from the allowable position range, a signal "please move rightward", namely, a signal instructing the person to be photographed to move rightward is outputted (S21). Then, the process proceeds to step S17. As a result of this movement, the face size may be deviated from the allowable size range, and hence, both the face size and the face position are determined.

In step S19, if the detected face position is determined to fall within the allowable position range, a signal "appropriate composition", namely, a signal indicating that the current standing position of the person to be photographed is in the intended position is outputted (S22). Next, it is checked whether the standing-position matching flag is ON (S25). If the standing-position matching flag is not ON, the flag is set to be ON (S23). Then, a time at this point is recorded as a set-position arrival time (S24), and the process returns to step S13.

If the standing-position matching flag is ON in step S25, it is checked whether a preset time (n second) elapses from the set-position arrival time (S26). If the preset time does not elapse, the process returns to step S13. At the time when the preset time elapses, the photograph is taken, that is, the shutter is activated (S27).

Figure 13:
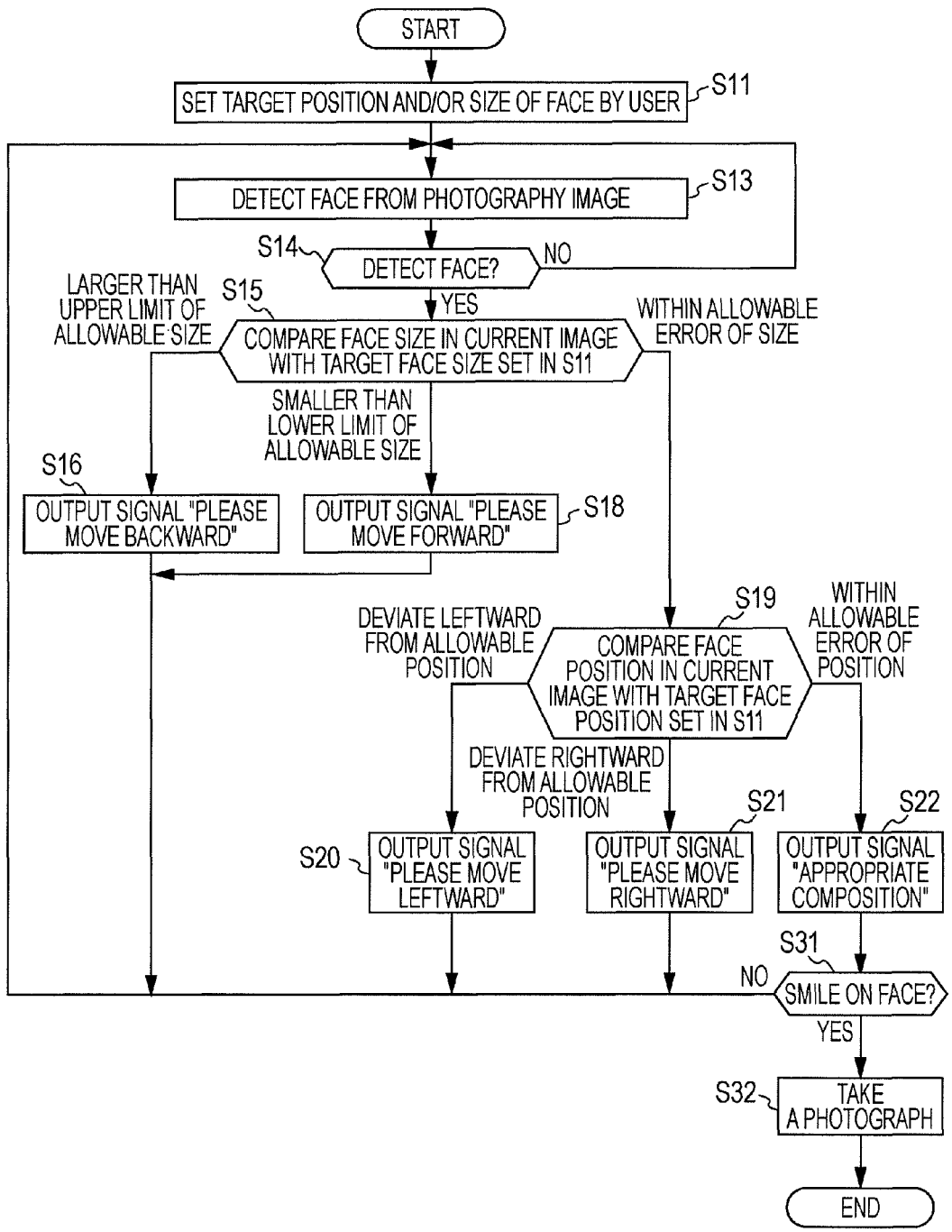
FIG. 13 is a flowchart showing another process procedure of the self-photographing using the mobile terminal according to the embodiment of the present invention.

FIG. 13 is a flowchart showing another process procedure of the self-photographing using the mobile terminal according to this embodiment. In FIG. 13, the same reference characters are attached to steps similar to the steps shown in FIG. 12, and overlapping explanation thereof is omitted. Both processes are different in that the trigger for activating the shutter is whether the timer or smile. In the process in FIG. 13, the timer process in FIG. 12 is not implemented, but the photographing is made upon detecting the smile of the person to be photographed. Accordingly, in the process shown in FIG. 13, steps S12, S17, S23 and S25 relating to the standing-position matching flag, and steps S24 and S26 relating to the timer are removed. On the other hand, step S31 of determining the smile is inserted after step S22, so that, upon detecting the smile, a photograph is taken, that is, the shutter is activated (S32).

These are the description of the preferred embodiment of the present invention. However, it may be possible to make various modifications and changes other than those described above. For example, instead of the LEDs 107a-107e, it may be possible to make the similar light-emission display on the display screen of the sub-display section 104a. Although an example of making detection and comparison of both the position and size is shown, it may be possible to detect and compare either the position or the size.

Additionally, although a case where the person to be photographed is single has been explained in the above description, it may be possible to apply this embodiment to a case where plural persons to be photographed exist. In this case, the above-described process is applied by identifying one of the plural persons. With the face-recognition technique at the present time, not only the person's face is detected, but also particular person's face can be distinguished from other person's faces. By using this technique, a face of one particular person to be photographed is traced, and the person's standing position can be determined. A "predetermined rule" includes the followings. (1) A face image of the user is registered in the terminal; the registered face image is compared with the face image in the photography image; and, a person to be photographed whose face image is matched as a result of the comparison is selected. When other person to be photographed exists, a face image of that person is not treated as a target for the comparison with the person indicator. (2) A face image of a person to be photographed appearing first in the photography image is selected. Preferably, after the standing position of this person is determined, an accompanying person enters a field of view. Even if the accompanying person joins in, the face image to be traced does not change. (3) A face image of a person to be photographed appearing finally in the photography image is selected. In this case, whenever a new person to be photographed appears in camera's view, the tracing target is updated to the face image of the newly appearing person.

The present application contains subject matter related to that disclosed in Japanese Priority Patent Application JP 2009-161757 filed in the Japan Patent Office on Jul. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photographing device, comprising:
a photographing section;
a display section that displays a photography image taken by the photographing section on a display screen;
person indicator setting means for setting a person indicator prepared in advance on the display screen;
an operation section that operates a target position and/or a target size of the person indicator;
person detection means for detecting a position and/or a size of a person in the photography image;
comparison means for comparing the detected position and/or the detected size of the person in the photography image with the target position and/or the target size;
guiding instruction means for generating an instruction for the person to be photographed to guide toward a direction coinciding with a comparison result by the comparison means; and
control means for controlling the photographing section such that, at a time when a predetermined condition is satisfied after the comparison result by the comparison means falls within a predetermined allowable error, a shutter is activated,
wherein the control means sets an allowable error in a vertical direction larger than that in a horizontal direction, at the time of determining whether the detected position of the person is matched with the target position.

2. The photographing device according to claim 1, wherein the guiding instruction means is light-guiding instruction means that implements light-indication of a forward, backward, right or left direction to which the person to be photographed is to be moved.

3. The photographing device according to claim 2, wherein the light-guiding instruction means includes a plurality of light-emitting elements.

4. The photographing device according to claim 2, wherein the light-guiding instruction means includes a sub-display section having a display screen.

5. The photographing device according to claim 1, wherein the guiding instruction means is audio guiding means that implements audio indication of a forward, backward, right or left direction to which the person to be photographed is to be moved.

6. The photographing device according to claim 1 wherein the person detection means detects a position and/or a size of a face of the person.

7. The photographing device according to claim 1, wherein the time when the predetermined condition is satisfied indicates that a predetermined time period elapses from a time when the comparison result by the comparison means falls within the predetermined allowable error.

8. The photographing device according to claim 7, further comprising means for allowing a user to set the predetermined time period.

9. The photographing device according to claim 1, wherein the time when the predetermined condition is satisfied indicates that a smile of the person to be photographed is detected by the person detection means after the comparison result by the comparison means falls within the predetermined allowable error.

10. The photographing device according to claim 1, further comprising means for, when the comparison result by the comparison means falls within the predetermined allowable error, notifying to that effect by light or audio.

11. The photographing device according to claim 1, further comprising detection means for detecting the vertical direction, wherein
the person indicator setting means sets the person indicator on the basis of the detected vertical direction.

12. The photographing device according to claim 1, wherein when a plurality of persons to be photographed exist, the comparison means compares a position and/or a size of a person to be photographed who is identified in accordance with a predetermined rule with the target position and/or the target size.

13. The photographing device according to claim 1, wherein a photography image of a subject is used as the person indicator prepared in advance.

14. A photographing control method, comprising the steps of:
    displaying a photography image of a background on a display screen in accordance with user's operation to a photographing section;
    setting a person indicator prepared in advance on the display screen in accordance with user's operation while overlaying the person indicator on the background;
    detecting a position and/or a size of a person to be photographed in the photography image of the background;
    comparing the position and/or the size of the person detected in the photography image with the target position and/or the target size;
    generating an instruction for the person to be photographed to guide toward a direction coinciding with the comparison result; and
    controlling the photographing section such that, at a time when a predetermined condition is satisfied after the comparison result falls within a predetermined allowable error, a shutter is activated,
    wherein the controlling step sets an allowable error in a vertical direction larger than that in a horizontal direction, at the time of determining whether the detected position of the person is matched with the target position.

15. A photographing device, comprising:
    a photographing section;
    a display section that displays a photography image taken by the photographing section on a display screen;
    a person indicator setting section that sets a person indicator prepared in advance on the display screen;
    an operation section that operates a target position and/or a target size of the person indicator;
    a person detection section that detects a position and/or a size of a person in the photography image;
    a comparison section that compares the detected position and/or the detected size of the person in the photography image with the target position and/or the target size;
    a guiding instruction section that generates an instruction for the person to be photographed to guide toward a direction coinciding with a comparison result by the comparison section; and
    a control section that controls the photographing section such that, at a time when a predetermined condition is satisfied after the comparison result by the comparison section falls within a predetermined allowable error, a shutter is activated,
    wherein the control sets an allowable error in a vertical direction larger than that in a horizontal direction, at the time of determining whether the detected position of the person is matched with the target position.

* * * * *